Figure 1:
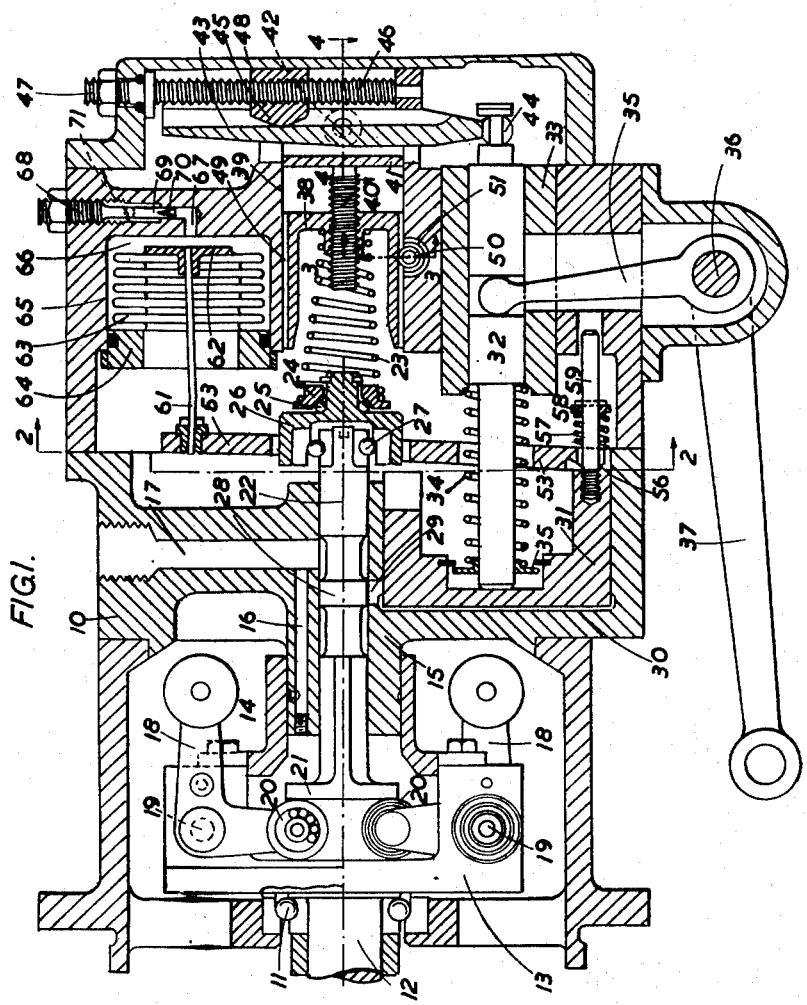

April 13, 1954

G. B. R. FEILDEN 2,675,220

SPEED GOVERNOR HAVING ITS OUTPUT AND SPEEDER
SPRING AUTOMATICALLY MODIFIED

Filed April 10, 1953

2 Sheets-Sheet 1

Inventor
G. B. R. FEILDEN
By Wilkinson & Mawhinney
Attorneys.

April 13, 1954  G. B. R. FEILDEN  2,675,220
SPEED GOVERNOR HAVING ITS OUTPUT AND SPEEDER
SPRING AUTOMATICALLY MODIFIED
Filed April 10, 1953  2 Sheets-Sheet 2

Inventor
G. B. R. FEILDEN
By Wilkinson & Mawhinney
Attorneys

Patented Apr. 13, 1954

2,675,220

UNITED STATES PATENT OFFICE 2,675,220

SPEED GOVERNOR HAVING ITS OUTPUT AND SPEEDER SPRING AUTOMATICALLY MODIFIED

Geoffrey B. R. Feilden, Lincoln, England, assignor to Ruston & Hornsby Limited, Lincoln, England, a British company Application April 10, 1953, Serial No. 348,012

Claims priority, application Great Britain April 15, 1952

12 Claims. (Cl. 264—4)

This invention relates to an engine speed governor of the type comprising a flyweight system loaded by a speeder spring and controlling a pilot valve, and a hydraulic motor actuating the power regulator of the governed engine and controlled by the pilot valve, with or without means conferring a permanent drooping characteristic, and including means conferring a temporary drooping characteristic, such means comprising a mechanical linkage so interconnecting the pilot valve, the movable member of the hydraulic motor and a resilient device that the latter acts as an auxiliary speeder spring, and that displacement of the movable member of the motor in the sense to reduce the power output of the engine causes the extension of the resilient device to vary in the sense to augment the total speeder spring-effort, and conversely, together with a dashpot device operative to allow the speeder spring-augmenting or -diminishing effort of the resilient device, due to a displacement of the movable member of the motor, to decay at a predetermined rate to zero or to a value substantially less than its initial value.

An object of this invention is an improved and simplified governor of this type, achieved by combining the said resilient and dashpot devices in a single component.

A further object of the invention is a governor of the kind specified in which the need for an additional auxiliary speeder spring is eliminated by using a pneumatic device, in which the rate of decay of the speeder spring-augmenting or -diminishing effort, furnished by superatmospheric or subatmospheric pressure in the pneumatic device, is controllable by means of an adjustable atmospheric leak.

According to this invention, the combined resilient and dashpot device is constituted by a pneumatic dashpot, or buffer, having a fixed anchorage on the body of the governor and a movable member connected to the hereinbefore mentioned mechanical linkage, the chamber of the dashpot being provided with an atmospheric leak furnished with an adjustable restrictor.

A pneumatic dashpot possesses the advantage that its operation is substantially unaffected by changes of temperature, which cause large changes of viscosity of oil or hydraulic fluids and consequently affect the rate of synchronisation of governors in which the temporary droop depends on the action of an hydraulic dashpot or on the communication of motion or pressure, from the movable member of the motor to the pilot valve or to an auxiliary valve member or to the abutment of a spring acting on the pilot valve, by means of a column of oil or hydraulic fluid. The use of a pneumatic buffer also eliminates the need for an additional spring.

In carrying out this invention, the pneumatic buffer is preferably of the type incorporating a flexible bellows, which normally will be made of metal and will therefore have inherent elasticity which will exert an effort on the pilot valve supplementing that of the speeder spring and varying with the position of the movable member of the motor, thereby conferring a permanent drooping characteristic, which will usually be of small magnitude compared with that of the temporary droop due to the pneumatic effort of the buffer. The effort exerted by the elasticity of the bellows will, however, be beneficial in suppressing backlash in the mechanical linkage.

Additional means for conferring a permanent droop of adjustable magnitude are preferably provided, for example a mechanical linkage of a known kind connecting the movable member of the motor with the speeder spring abutment and having adjustable means for varying its mechanical transmission ratio. By providing a range of adjustment enabling the permanent droop conferred by this linkage to be varied between a positive and a negative limit, the positive droop conferred by the elasticity of the bellows can be augmented or decreased, or, if desired, exactly compensated so as to render the governor isochronous.

Another object of the invention is the provision of a simple method and means for adjusting the magnitude of the temporary drooping characteristic conferred by the pneumatic buffer, the method consisting in partially filling the buffer chamber with oil, preferably thin oil, and adjusting the quantity of oil contained in the chamber to adjust the clearance volume of the chamber, and hence the effective spring rate of the pneumatic buffer, and the means consisting in providing the buffer chamber with a filling hole for the oil, closable by a plug.

Figures 2, 4:
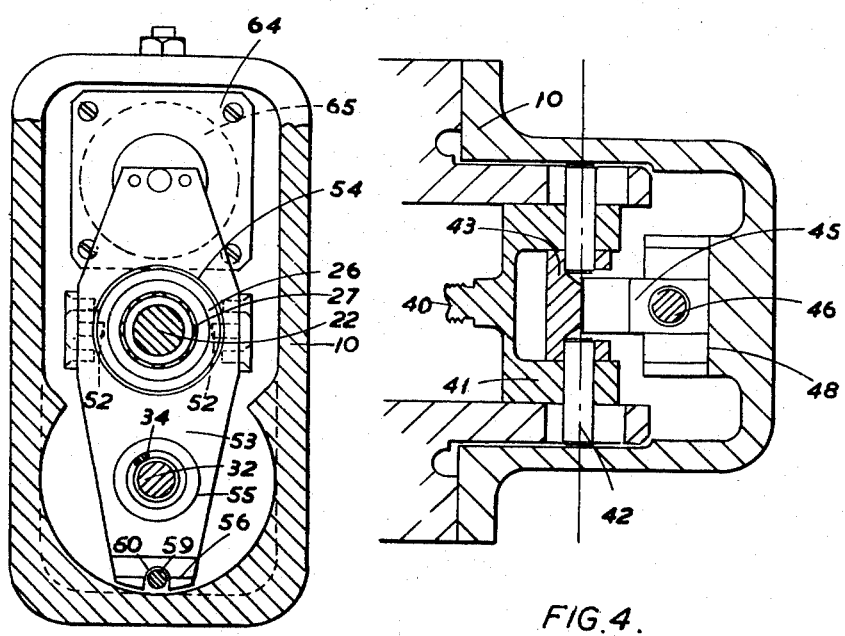

A specific embodiment of the invention is illustrated by way of example in the accompanying drawings, and is hereinafter described with reference thereto, without implied limitation of the scope of the invention as defined in the annexed claims. In the drawings, Figure 1 is a sectional elevation of the governor in a plane containing the axes of the hydraulic motor and of the pilot valve and flyweight system;

Figure 2 is a transverse section on the line 2—2 of Figure 1; and

Figure 3:
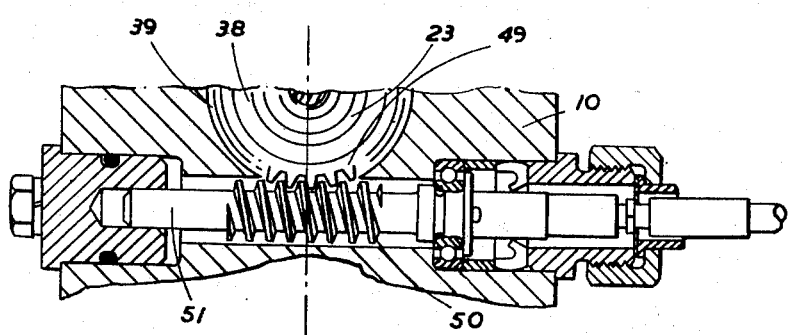

Figures 3 and 4 are fragmentary sections on the lines 3—3 and 4—4, respectively, of Figure 1.

Referring to the drawings, the governor comprises a body 10 made in several pieces for convenience of assembly and dismantling. The left hand end of the body, as viewed in Figure 1, carries a bearing 11 in which is supported a shaft 12 driven by the governed engine through an appropriate transmission system (not illustrated). Shaft 12 is formed integrally on a flyweight carrier 13 to which is secured an extension 14 axially bored to provide a spigot bearing on an internal boss 15 of the body. This bearing is lubricated by oil fed through a branch gallery 16 from the main inlet gallery 17 of the governor connected to a source of oil under pressure. Cranks 18 carrying flyweights are pivotally mounted at 19 on the carrier 13, and the toes of cranks 18 carry antifriction rollers 20 mounted on ball bearings. Rollers 20 bear on the enlarged head 21 of a pilot valve 22, which slides and rotates in a cylindrical bore of the body. The pilot valve is loaded, against the effort of the flyweight, by a speeder spring 23 through a thrust collar 24, a thrust bearing 25, a cap member 26 and a thrust bearing 27.

The pilot valve is pressure balanced, being waisted on each side of a single land 28 to provide two annular oilways of which the right-hand one (as seen in Figure 1) communicates with the pressure-oil inlet 17 and the left-hand one is vented through flutes formed on the left-hand end of the pilot valve 22. In the constant-speeding equilibrium position, as shown in Figure 1, land 28 covers without lap a port 29 communicating with a hydraulic motor cylinder 30 formed in the body. A piston 31 slides in cylinder 30, and when the pilot valve is displaced from the constant-speeding position to the left as viewed in Figure 1, pressure oil is admitted to the left-hand face of piston 31 to move it to the right. Piston 31 operates a rod 32, which slides in a bushing 33 and is held in contact with the piston by a spring 34 trapped between a shoulder on the bushing and a collar 35 secured to the rod 32. Spring 34 acts as the return spring for piston 31, which with rod 32 constitutes the movable member of the hydraulic motor. Displacement of the pilot valve to the right from the position of Figure 1 vents the cylinder 30 and allows spring 34 to move the piston 31 to the left. Rod 32 is slotted to receive the bulbous head of a lever 35 mounted on a shaft 36, which is journalled in the body and carries an external lever 37 connected to the power regulator of the governed engine (not illustrated) so that upward movement of lever 37 increases the power output of the engine, and conversely.

The abutment of the speeder spring is in the form of a thimble 38, which can slide and rotate in a cylindrical bore 39 of the body and has a central boss on which the spring 23 is centred and which is axially bored and tapped to constitute a nut engaging a lead-screw 40 formed integrally on an abutment locating member 41, which can also slide in the bore 39. Member 41 is connected by coaxial pivots 42 (see also Figure 4) with a lever 43 whose lower extremity 44 is formed as a striking fork engaging a necked extension of the rod 32. This engagement prevents the lever 43 from rotating about the axis of the bore 39, and since relative movement between lever 43 and member 41 can only take place about the axis of pivot 42, which is perpendicular to the axis of bore 39, the member 41 is prevented from rotating in the bore 39. Lever 43 is held by the effort of the speeder spring 23 against a fulcrum block 45 internally threaded to engage a lead-screw 46 rotatably supported in the body and having an external projection 47, by which it can be rotated to raise or lower the fulcrum block, which is prevented from rotating by engagement of its flat rear face 48 with a flat internal face of the body 10.

On the outer surface of the speeder spring abutment thimble 38 are cut worm-wheel teeth 49 engaged by a worm 50 mounted on a shaft 51 journalled in the body and provided with external means (not illustrated) for rotating it to cause the speeder spring abutment thimble 38 to advance or retire along the lead-screw 40 and thereby vary its axial spacing from the abutment locating member 41.

The cap member 26, axially located on the pilot valve 22 by the bearing 27, is connected by co-axial pivot pins 52 with a lever 53 in the form of a plate having a clearance aperture 54 accommodating the cap 26 and another clearance aperture 55 accommodating rod 32 and spring 34 (see also Figure 2). At its lower end lever 53 has a knife edge 56 held in contact with piston 31 by a spring 57 abutting against a collar 58 secured to a stud 59 screwed into the piston. A clearance notch 60 in lever 53 accommodates stud 59.

The upper end of lever 53 is connected by a rod 61 having a certain amount of flexibility with a disc 62 to whose circumference is attached one end of a metallic flexible bellows 63, the other end of which is attached to the margin of an opening in a plate 64 secured over the open end of a cylindrical bore 65 in the body. The plate 64, bellows 63 and disc 62 form a gas-tight closure of the cylinder 65, enclosing a chamber 66 of variable volume, which is vented to atmosphere through a passage 67, an adjustable restrictor 68, 69, 70 and an atmospheric vent 71. The restrictor is constituted by a screw plug 68, which has a stem 69 of reduced diameter fitting closely into passage 67 and provided with tapered flutes 70. The latter provide a leak from the passage 67 to a clearance round the stem 69 communicating with the vent 71, the cross-sectional area of the leakage path being adjustable by screwing the plug 68 in and out.

In this governor the flyweight system 13, 18, 19, 20, loaded by the speeder spring 23 controls the pilot valve 22, which in turn controls the hydraulic motor 30, 31, 32, 34, 35, 37 actuating the power regulator of the governed engine. Under-speeding causes the pilot valve to move to the left and admit oil to cylinder 30 and move piston 31 and rod 32 to the right, thus moving levers 35, 37 to increase engine power output. Conversely, over-speeding causes the pilot valve to move to the right and vent the cylinder 30, causing lever 37 to decrease the engine power output.

A temporary drooping characteristic is conferred on the governor by the mechanical linkage, constituted by the lever 53 and rod 61, connecting the pilot valve 22 (through the cap member 26 and bearing 27), the movable member 31, 32 of the hydraulic motor and the combined resilient and dashpot device, in the form of a pneumatic buffer, constituted by the variable volume pneumatic chamber 66 enclosed by the cylinder 65, disc 62, plate 64 and flexible bellows 63. The resilient effort of this buffer, acting as an auxiliary speeder spring, is mainly provided by the elasticity of the air entrapped in the chamber 66, the dashpot action, operative to allow delayed restoration of the resilient pneumatic effort of the buffer to its former value after a displacement of piston 31, being provided by the atmospheric leak 67, 70, 71, and the rate of synchronisation after such a displacement being regulatable by adjusting the restrictor 68, 69, 70.

Under constant speeding conditions, the pilot valve land 28, having no lap on the fixed port 29, is always in exact register with this port, and consequently under these conditions the position of the pivot axis 52 is always the same. The lever 53 may therefore be regarded as having a fixed fulcrum 52 in constant speeding conditions and the position of disc 62 and hence the volume of chamber 66, varies linearly with the position of piston 31, being increased by displacement of piston 31 to the right (as viewed in Figure 1), corresponding to increase of load on the engine, and conversely. If the leak 67—71 were closed, the pressure in chamber 66 would vary inversely as the volume under isothermal conditions—which will obtain approximately in practice except for very rapid changes of volume—and consequently the effort exerted on the lever 53, and hence on the pilot valve 22, by the pneumatic buffer, due to the elasticity of its contained air, would vary linearly with the position of piston 31, in such a way that the algebraic sum of this effort and that of the speeder spring would decrease as the piston is displaced to the right, and conversely. This is the condition for producing a positive drooping characteristic, i. e. decrease of synchronous speed with increase of load.

When the atmospheric leak 67—71 is operative, the pressure in chamber 66 will equalise with the external atmospheric pressure after a certain delay, dependent on the adjustment of the restrictor 68—70, with the result that the effort exerted by the pneumatic buffer, due to the elasticity of its contained air, reverts gradually to zero, so that the drooping characteristic thereby conferred on the governor is of a temporary nature. Restrictor 68—70 can be adjusted while the governor is running.

The spring-rate of the pneumatic buffer, and hence the magnitude of the temporary drooping characteristic thereby conferred, depends on the rate of volume change of chamber 66 per unit stroke of the bellows disc 62, which can be varied by altering the clearance volume of the chamber. This can be effected by partially filling the chamber with thin oil, introduced by removing the screw-plug 68. By adjusting the quantity of oil so introduced the clearance volume can be decreased by a predetermined amount, and the magnitude of the temporary droop correspondingly increased from the minimum value obtained when the chamber 66 is empty.

The inherent elasticity of the bellows 63 is additive to the elasticity of the air contained in the chamber 66 and therefore increases the magnitude of the drooping characteristic conferred by the pneumatic buffer, by an amount which is of a permanent nature since it is unaffected by the action of the leak 67—71. The permanent droop so conferred will usually be of small magnitude compared with that of the temporary droop due to the elasticity of the air contained in chamber 66.

The mechanical linkage between the movable member of the motor and the speeder spring abutment, provided by the lever 43 confers a permanent drooping characteristic whose magnitude can be varied between positive and negative limiting values by adjusting the position of fulcrum 45, since the position of the spring abutment thimble 38, as determined by that of the abutment-locating member 41, and consequently the setting of the speeder spring 23, varies linearly with that of piston 31 and rod 32, the magnitude and algebraic sign of the ratio between the displacements of the piston and rod 31, 32 and of the abutment thimble 38 being dependent on the adjustment of the fulcrum 45. This can be carried out while the governor is running.

The basic speeder spring setting can be adjusted by means of the worm 50 to vary the axial spacing of the spring abutment thimble 38 from the abutment-locating member 41, through the action of the lead-screw and nut means 38, 40. This adjustment, too, can be made while the governor is running. The basic setting is substantially unaffected by common axial displacements of the abutment thimble 38 and abutment-locating member 41 by the lever 43, since the helix angle of the worm wheel teeth on the thimble 38 is such that the full range of axial displacement of the thimble 38 relatively to the worm 50 will only rotate the thimble through a small part of a complete turn and hence will displace it axially relatively to the member 41 through a small fraction only of the pitch of the lead-screw 40.

In carrying this invention into practice the construction herein described may be modified in any desirable way within the competence of those skilled in the art, without departing from the spirit of the invention, which shall be deemed to include all such modifications as are within the scope of the annexed claims.

I claim:

1. A speed governor for an engine having a power-output-regulator, said governor comprising a body, hydraulic motor means including a movable member operative on said regulator, a pilot valve adapted to control said motor means, a speeder spring operative on said pilot valve, an engine-driven flyweight carrier, centrifugal flyweight means mounted on said carrier and exerting on said pilot valve an effort opposed to that of the speeder spring, a pneumatic buffer comprising a part anchored on the body and a movable part, a mechanical linkage interconnecting said movable part with the pilot valve and with the movable member of the motor in such a way that displacement of said movable member in the sense to reduce the engine's power output causes a proportionate displacement of the movable part of the buffer causing a proportionate change of air pressure within the buffer, said change of pressure acting through the linkage on the pilot valve in a sense to augment the effort of the speeder spring, displacement of the movable member of the motor in the opposite sense having a similar but contrary effect, a passage providing an atmospheric leak from the pneumatic buffer and a manually adjustable restrictor for variably restricting said passage.

2. A governor as defined in claim 1, including a flexible bellows connecting the movable part of the buffer with the anchored part thereof and with said anchored part and movable member defining a chamber of variable volume.

3. A governor as defined in claim 2, whereof the bellows is made of an elastic material.

4. A governor as defined in claim 1 including further a movable speeder spring abutment, a mechanical linkage interconnecting the latter with the movable member of the motor in such a way that displacement of said movable member causes a proportionate displacement of said abutment for varying the effort of the speeder spring, and manually operable means for adjusting said linkage so as to vary the magnitude and algebraic sign of the ratio of said displacements.

5. A governor as defined in claim 4, in which the mechanical linkage interconnecting the movable member of the motor with the speeder spring abutment includes a lever connected to said movable member, a fulcrum for said lever mounted on the body, an abutment-locating member pivotally connected to said lever and movable thereby in a direction for varying the speeder-spring's effort, and manually operable means for adjusting the position of the speeder-spring abutment relatively to said locating member for varying the speeder-spring's effort independently of such variation thereof as is caused by displacement of the movable member of the motor through the agency of said lever.

6. A governor as defined in claim 5, wherein the means for adjusting the position of the speeder-spring abutment relatively to the abutment-locating member includes lead-screw and nut means operatively connected to said speeder-spring abutment and manually operable worm and worm-wheel gear means operatively connected to said speeder-spring abutment for operating the lead-screw and nut means.

7. A governor as defined in claim 6, wherein the lead-screw is fixed to the abutment-locating member and the nut is constituted by the speeder-spring abutment itself, the latter being rotatable with respect to the body, and the worm-wheel being unitary therewith, and the worm being journalled in the body.

8. A governor as defined in claim 1, including further a movable speeder-spring abutment, a lever interconnecting the latter with the movable member of the motor, a fulcrum for said lever adjustably displaceable in the direction of the length of the lever with respect to the body, whereby displacement of said movable member causes a proportionate displacement of the speeder-spring abutment for varying the effort of the speeder-spring, the magnitude and algebraic sign of the ratio of said displacements being variable by displacement of said fulcrum, and manually operable means for adjustably displacing said fulcrum.

9. A governor as defined in claim 8, whereof the manually operable means for displacing the said fulcrum comprise a lead-screw.

10. A governor as defined in claim 1, wherein the mechanical linkage interconnecting the movable member of the motor with the pilot valve and with the movable part of the pneumatic buffer comprises a lever pivotally connected with the pilot valve and having one end engaged with said movable member and the other end connected with said movable part.

11. A governor as defined in claim 1, whereof the pneumatic buffer comprises a chamber of variable volume vented to atmosphere through said leak-passage, said chamber being provided with a filling hole and a removable plug for closing said hole, whereby the effective volume of the chamber may be decreased to a predetermined extent by introducing into said chamber, through said hole, a predetermined quantity of oil.

12. In a governor as defined in claim 1, whereof the pneumatic buffer comprises a chamber vented to atmosphere through said leak-passage, the volume of said chamber being variable by displacement of the movable part of the buffer, the method of varying the rate at which the pneumatic effort exerted by the buffer changes as said movable part is displaced, which method consists in altering the clearance volume of the chamber by partially filling the chamber with oil, the chamber being provided for this purpose with a filling hole and a plug for closing said hole after introduction of the oil.

No references cited.